Nov. 19, 1940.　　C. A. GUSTAFSON　　2,222,071
DETACHABLE SCARIFIER TOOTH
Filed Dec. 13, 1938
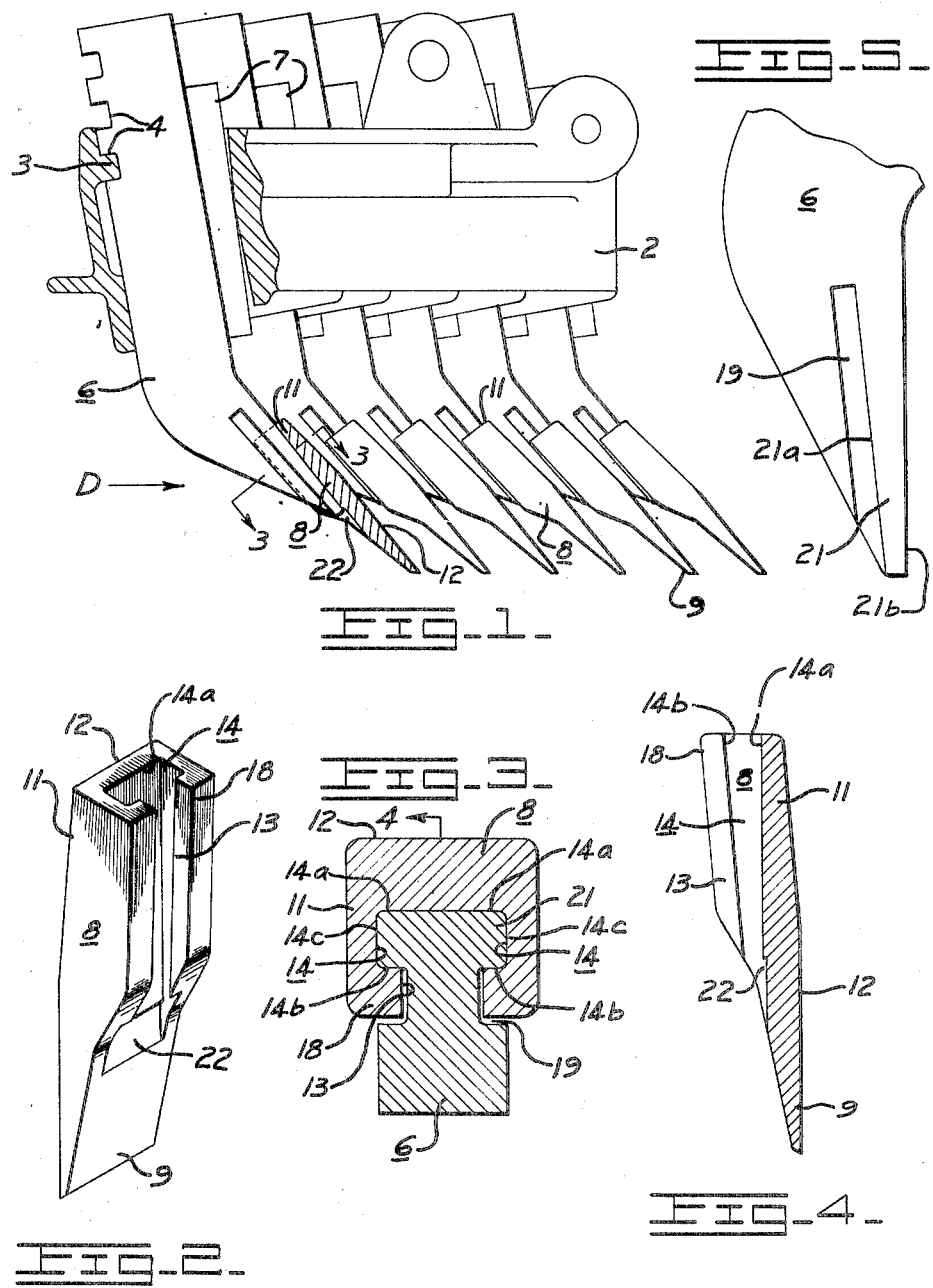

Patented Nov. 19, 1940

2,222,071

UNITED STATES PATENT OFFICE 2,222,071

DETACHABLE SCARIFIER TOOTH

Carl A. Gustafson, Peoria, Ill., assignor to Caterpillar Tractor Co., San Leandro, Calif., a corporation of California Application December 13, 1938, Serial No. 245,479

4 Claims. (Cl. 262—8)

My invention relates to scarifiers, and more particularly to a detachable scarifier tooth adapted for use with earth-working machines such as road graders, ditchers, shovels, etc.

The working point of a scarifier tooth is subjected to great wear during working thereof; and for example with respect to road grader scarifiers, the teeth of which are formed at the lower ends of relatively long shanks, it becomes necessary when a tooth is worn to replace the entire unit which includes the shank unless a detachable tooth is provided. Detachable scarifier teeth have been employed to overcome this disadvantage, but my invention has as its objects, among others, to provide in a detachable scarifier tooth construction an improved connecting means between the tooth and the tooth supporting shank or member which is of simple and economical construction, which provides a simple wedge connection between the tooth and its supporting member as the sole means of connection therebetween, which permits the tooth when it is to be replaced to be removed by a few blows from a hammer or the like, and which requires very little manipulation in assembling the tooth onto its supporting member. Other objects of the invention will become apparent from a perusal of the following description thereof.

In general, I provide a tapered tongue and groove connection between the detachable tooth and the shank or supporting member upon which such tooth is mounted to thus provide a wedging engagement between the shank and the tooth. The taper is in such direction with respect to the working end or point of the tooth that the pressure of the tool in the ground maintains such connection. The wedging connection is the only means of connection between the tooth and the shank, and when it is desired to remove a worn tooth to replace it by a new one, this may be done through a few blows of a suitable implement such as a hammer.

Reference will now be made to the drawings for a more detailed description of the invention. In such drawing:

Fig. 1 is a side elevation, parts being broken away and shown in section to disclose more clearly the construction, of a scarifier carrying block and scarifier shanks mounted thereon, of the type generally employed on road graders. The improved detachable teeth of my invention are also illustrated in this view.

Fig. 2 is a perspective view of the tooth of my invention.

Fig. 3 is a transverse section through a tooth and a shank upon which the tooth is mounted, taken in a plane indicated by line 3—3 in Fig. 1.

Fig. 4 is a longitudinal section through the tooth taken in a direction indicated by arrow 4 in Fig. 3.

Fig. 5 is a side elevation of the portion of the shank upon which the tooth is adapted for detachable connection.

Although the detachable scarifier tooth of my invention has general application on all kinds of machines where earth digging teeth are employed, I have found it particularly applicable on scarifier mechanism for road grading machines. Fig. 1 illustrates a conventional form of mounting for such scarifier mechanism on road grader machines, in which scarifier carrying block 2 is provided with flange means 3 adapted to engage in a selected notch 4 in the scarifier shank 6; the shank being held in position by a wedge member 7. The lower end of each shank 6 is pointed and extends at an angle toward the forward end of the road machine (not shown), or in other words, toward the usual direction of movement of the machine which is indicated by direction arrow D. The detachable scarifier teeth 8 of my invention are mounted on the lower ends of the shanks, with their working points 9 extending at an angle toward the direction of movement of the machine. Such teeth are preferably made of forged steel because of the wear resisting properties of this material.

The point part 9 of the tooth has a relatively broad face, and in addition to such point part the tooth is provided with a substantially U-shaped socket part 11 adapted to telescope over the lower end of shank 6. The legs of the U-shaped part extend rearwardly thus providing a substantially smooth uninterrupted front face 12 over the entire body of the tooth, and a rear slot or recess 13 adapted to receive the shank. It is to be observed that the over-all width of the U-shaped part is the same as that of the point part 9 but that the over-all dimension transverse to such width is such that when the tooth is mounted over the shank, it leaves a portion of the shank to the rear of the tooth uncovered, thereby obviating unnecessary weight and expense of additional material. In each of its sides, the U-shaped part 11 is formed with a longitudinally extending tapered groove 14; the taper of which is between front flat surface 14a and rear flat surface 14b; such surfaces being non-parallel. The distance between the side surfaces 14c of the grooves is the same throughout; so that no taper is formed between these surfaces. Because of the provision of the oppositely spaced apart tapered side grooves 14 in the U-shaped part 11 of the tooth, there are formed opposite rear flanges 18 adjacent rear recess 13.

Shank or tooth supporting member 6 upon which the tooth is adapted for detachable connection, is preferably pointed at its tooth receiving end; and it has formed in each of its sides a longitudinally extending slot or recess 19 adapted to receive a tooth flange 18 when the tooth is positioned over the shank. The wedging effect described above does not occur by engagement of the tooth flanges 18 in the shank recesses 19, but is obtained by virtue of oppositely positioned longitudinally extending, tapered tongues 21 adjacent recesses 19 and which engage in the tooth grooves 14. The taper of such tongues 21 is complementary to the taper of the grooves 14, and is formed by rendering the rear flat surface 21a of each tongue 21 non-parallel to the front flat face 21b of the shank; the taper of each shank tongue 21 being complementary to that of each tooth groove 14. It is to be noted that the inside face of the tooth which is opposite to the front face 12 thereof, forms a planar continuation of the front flat surfaces 14a of grooves 14 and is adapted to lie flush against the front flat face 21b of the shank. This in cooperation with the tapered tongue and groove fit makes for a rigid connection when the tooth is wedged onto the shank. As with respect to the distance between the side surfaces 14c of the grooves, the distance between the side surfaces of the tongues 21 is the same throughout, and substantially the same as that between groove side surfaces 14c. Hence no wedging occurs between these surfaces but their close fit holds the tooth firmly on the shank, against lateral displacement. The taper of the tongues 21 and grooves 14 is such that the narrowest part is adjacent the working edge or point part 9 of the tooth; and as can be seen from Fig. 1, when the tooth is wedged tightly onto the shank, the entire point part 9 projects below the lower end of the shank. Such point part 9 does not cover or envelope the end of the shank but lies substantially to one side of the socket part 11 and also the front face 21b of the shank. Hence, there is no obstruction which would interfere with the tight wedging engagement; particularly after wear occurs in the wedged tongue and groove connections and play tends to develop, because then the tooth can always work up into wedging engagement with the shank. Also, socket part 11 does not abut any shoulder on the shank which, after occurring would also provide such undesirable obstruction which would interfere with the wedging engagement. Socket part 11 is open longitudinally at both ends, and can thus be wedged tightly.

Because of the described wedging connection, it is unnecessary to provide any other means, such as keys, or securing nuts and bolts, to hold the detachable tooth on the shank. In assembling a tooth onto a shank, it is only necessary to telescope the tooth thereover by hand until it has slight wedging engagement with the shank, which wedging engagement may be facilitated by striking the tooth a few light blows with a hammer or the like, and during working of the tooth in the ground, it becomes tightly wedged and secure. When it is desired to remove a worn tooth for replacement by a new tooth, one need only strike the exposed upper edge of the tooth a few blows with a hammer or the like to effect such disengagement.

Preferably, the upper portion of the front face 12 of the tooth is inclined toward its rear, to streamline the flow of earth and minimize lodging of earth along the front upper edge of the tooth. Also the rear face of tooth point 9 adjacent grooves 14 is provided with a relief 22 to preclude burring of the edge of shank 6 which might otherwise occur during working of the tooth.

Although in the preferred embodiment of the invention, the tapered grooves 14 are provided in the tooth and the tapered tongues 21 on the shank, this arrangement may be reversed. The provision of the tapered grooves in the tooth is, however, desirable from a manufacturing standpoint. Also, the tooth may be made to telescope within the shank but this is not as desirable as telescoping the tooth over the shank because the latter arrangement permits ready removal of the tooth by striking its exposed upper edge.

I, therefore, claim as my invention:

1. A detachable scarifier tooth adapted to be attached to a tooth supporting member comprising a body provided with a relatively broad front face and having a point part and another part shaped for telescopic mounting over said tooth supporting member, said latter part being substantially U-shaped and having in each of its sides a longitudinally extending tapered groove for wedging engagement with a complementary tapered tongue on said supporting member, the taper of each groove being formed of non-parallel flat surfaces which extend in such direction with respect to said broad front face that a section through said face and through said non-parallel surfaces defines substantially parallel lines, and each of said sides of said U-shaped part having a flange adjacent the groove which is adapted to be received in non-wedging engagement in a recess in said supporting member.

2. A detachable scarifier tooth adapted to be attached to a tooth supporting member comprising a body having a point part and another part shaped for telescopic mounting over said tooth supporting member; said latter part being substantially U-shaped, and having a front face forming a continuation of the front face of said tooth part and a rear recess to receive said tooth supporting member, each of the sides of said U-shaped part having a longitudinally extending tapered groove for wedging engagement with a complementary tapered tongue on said supporting member, the taper of each of said grooves being formed by front and rear non-parallel surfaces which extend in such direction with respect to the front face that a section through said face and through said non-parallel surfaces defines substantially parallel lines, the distance between the side surfaces of said grooves being substantially the same throughout the extent of such side surfaces, and each of said sides of said U-shaped part having a flange adjacent the groove which is adapted to be received in non-wedging engagement in a recess in said supporting member.

3. A scarifier construction comprising a tooth supporting member, a tooth member provided with a relatively broad front face and having a substantially U-shaped part for telescopic positioning over said supporting member and of such size as to leave a portion of said supporting member uncovered when telescoped thereover, and spaced apart tapered grooves in said U- shaped part for wedging engagement with spaced apart complementary tapered tongues on said supporting member, the taper of each groove being formed of non-parallel flat surfaces which extend in such direction with respect to said broad front face that a section through said face and through said non-parallel surfaces defines substantially parallel lines, said tongues and grooves providing the sole means for connection between said members and said members being so constructed as to be free of any obstruction which would interfere with such wedging engagement; the supporting member being provided with recesses adjacent said tongues to receive in non-wedging engagement flanges on said tooth member adjacent said grooves.

4. A scarifier tooth adapted to be attached by wedging engagement to a tooth supporting member comprising a body provided with a relatively broad front face and having a tooth part and a U-shaped socket part arranged longitudinally with respect to said tooth part and open longitudinally at both ends, the tooth part lying substantially to one side of said socket part, each of the sides of said U-shaped socket part having a longitudinally extending tapered groove for wedging engagement with a complementary tapered tongue on said supporting member, the taper of each of said grooves being formed by front and rear non-parallel surfaces which extend in such direction with respect to said relatively broad front face that a section through said face and said non-parallel surfaces defines substantially parallel lines, said U-shaped part also having an inside face which forms substantially a planar continuation of said front flat surfaces of said tapered grooves and which is adapted to lie flush against a front flat face on said supporting member, and each of said sides of said U-shaped part having a flange adjacent the groove which is adapted to be received in non-wedging engagement in a recess in said supporting member.

CARL A. GUSTAFSON.